(12) United States Patent
Davies et al.

(10) Patent No.: US 9,457,832 B2
(45) Date of Patent: Oct. 4, 2016

(54) STEERING COLUMN ASSEMBLY

(71) Applicant: TRW Limited, Solihull West Midlands (GB)

(72) Inventors: Niclas Davies, West Midlands (GB); Mark Anthony Wilkes, West Midlands (GB)

(73) Assignee: TRW Limited, Solihull, West Midlands (GB)

(*) Notice: Subject to any disclaimer, the term of this patent is extended or adjusted under 35 U.S.C. 154(b) by 0 days.

(21) Appl. No.: 14/401,692

(22) PCT Filed: May 16, 2013

(86) PCT No.: PCT/GB2013/051267
§ 371 (c)(1),
(2) Date: Nov. 17, 2014

(87) PCT Pub. No.: WO2013/171497
PCT Pub. Date: Nov. 21, 2013

(65) Prior Publication Data
US 2015/0166094 A1    Jun. 18, 2015

(30) Foreign Application Priority Data
May 18, 2012 (GB) .................................. 1208791.2

(51) Int. Cl.
*B62D 1/184* (2006.01)
*B62D 1/189* (2006.01)

(52) U.S. Cl.
CPC .............. *B62D 1/184* (2013.01); *B62D 1/189* (2013.01)

(58) Field of Classification Search
CPC ....... B62D 1/184; B62D 1/187; B62D 1/185
USPC ............................................ 74/493; 280/775
See application file for complete search history.

(56) References Cited

U.S. PATENT DOCUMENTS 4,307,626 A * 12/1981 Sanada et al. .................. 74/493
5,257,813 A * 11/1993 Snell ............................. 280/775
(Continued)

FOREIGN PATENT DOCUMENTS

| EP | 1510433 A1 | 3/2005 |
|---|---|---|
| EP | 1529713 A2 | 5/2005 |
| GB | 2463138 A | 3/2010 |

OTHER PUBLICATIONS

Patents Act 1977: Search Report under Section 17, Application No. GB 1208791.2, dated Aug. 26, 2012.
(Continued)

*Primary Examiner* — Ruth Ilan
(74) *Attorney, Agent, or Firm* — MacMillan, Sobanski & Todd, LLC

(57) ABSTRACT

A steering column assembly for a vehicle, comprises a shroud comprising an axially movable upper portion and an axially fixed lower portion, which move telescopically to provide adjustment for reach of the steering column assembly, a steering shaft supported by the shroud, a pivot which connects a part of the lower portion to a fixed part of the vehicle, a clamp mechanism which releasably fixes the upper and lower portions and the shroud in position relative to a further fixed part of the vehicle. A sprung support assembly is secured to a fixed part of the vehicle and includes an axle that passes underneath the upper portion of the shroud and a cylindrical roller that surrounds a part of the axle and has an outer surface that engages the underside of the shroud and an inner surface that bears on the axle, the sprung support at least partially supports the weight of the shroud when the clamp mechanism is released, and the cylindrical roller rotating around the axle as the shroud is adjusted for reach.

5 Claims, 3 Drawing Sheets

(56) References Cited

U.S. PATENT DOCUMENTS

| | | | |
|---|---|---|---|
| 6,419,269 B1* | 7/2002 | Manwaring et al. | 280/775 |
| 7,354,068 B2* | 4/2008 | Ishida et al. | 280/775 |
| 2002/0027355 A1 | 3/2002 | Bohlen et al. | |
| 2005/0166700 A1* | 8/2005 | Ishida et al. | 74/493 |
| 2005/0225068 A1* | 10/2005 | Ishida et al. | 280/775 |
| 2009/0107283 A1* | 4/2009 | Uesaka | 74/493 |
| 2012/0198956 A1* | 8/2012 | Takezawa et al. | 74/493 |

OTHER PUBLICATIONS

PCT International Search Report and Written Opinion, Application No. PCT/GB2013/051267, dated May 22, 2014.

* cited by examiner

STEERING COLUMN ASSEMBLY

CROSS-REFERENCE TO RELATED APPLICATIONS

This application is a national stage of International Application No. PCT/GB2013/051267 filed May 16, 2013, the disclosures of which are incorporated herein by reference in entirety, and which claimed priority to Great Britain Patent Application No. 1208791.2 filed May 18, 2012, the disclosures of which are incorporated herein by reference in entirety.

BACKGROUND OF THE INVENTION

This invention relates to improvements in steering column assemblies for vehicles.

It is known to provide a steering column assembly in which the steering shaft is adjustable for steering wheel height known as reach and for steering wheel distance known as rake. Such assemblies are known as double adjust steering columns. A steering column shroud is provided that supports the steering shaft that in turn supports the steering wheel. The shroud is in two parts, an upper part and a lower part, with the upper part telescoping over or into the lower part to permit the length of the shroud, and hence reach of the steering, to be adjusted. The lower part is secured to the vehicle at first point by a pivot and the upper part is secured to a fixed part of the vehicle at location nearer the steering wheel by a releasable clamp mechanism. When the clamp mechanism is clamped the upper and lower parts of the shroud are locked together. When released, the upper and lower parts of the shroud can move telescopically to enable reach to be adjusted. Also the whole shroud can be tilted up or down relative to the vehicle by pivoting around the pivot to provide rake adjustment.

The weight of the steering wheel and shaft and the shroud can be quite considerable, especially so where the column assembly also includes an electric motor and gearbox or a torque sensor, all of which are common parts of many electric power assisted steering assemblies. If the clamp mechanism is released and some additional support of the shroud is not present the steering wheel and shroud could fall down into a drivers lap with considerable force. Also, the weight of the assembly may inconvenience the driver when raising the wheel to the required position and securing the clamp mechanism. As the driver typically needs one hand free to operate the clamp this adjustment may prove burdensome.

To solve this problem it is common to provide a spring loaded support mechanism which acts between the vehicle and a part of the shroud. The spring mechanism takes some of the weight of the shroud and shaft and wheel when the clamp assembly is released for adjustment. This damps the fall of the assembly and assists the driver when they try to make rake adjustments by taking some of the weight.

In one known example of a possible prior art arrangement for a spring loaded support mechanism, the spring mechanism comprises a sling having a support bar that passes under the upper part of the shroud and which is connected at each end to a respective sprung arm. One arm is provided on each side of the shroud and connects an end of the arm to a fixed part of the vehicle body, usually above the shroud. Each arm comprises a coil spring or a leaf spring. In adjusting the assembly for reach, the base of the sling must slide over the lower surface of the upper person shroud as it moves relative to the lower portion. This movement can be quite stiff if friction is high and the operation may be noisy.

BRIEF SUMMARY OF THE INVENTION

According to a first embodiment the invention provides a steering column assembly for a vehicle, the assembly comprising a shroud comprising an axially movable upper portion and an axially fixed lower portion, the upper and lower portions moving telescopically to provide adjustment for reach of the steering column assembly, a steering shaft which is supported by the shroud, a pivot which connects a part of the lower portion to a fixed part of the vehicle, a clamp mechanism which releasably fixes the upper and lower portions in position relative to one another and which also fixes the shroud in position relative to a further fixed part of the vehicle, and a sprung support assembly which acts between a fixed part on the vehicle and which includes an axle passes underneath the upper portion of the shroud and a cylindrical roller that surrounds a part of the axle and has an outer surface that engages the underside of the shroud and an inner surface that bears on the axle, the sprung support at least partially support the weight of the shroud when the clamp mechanism is released, and the cylindrical roller rotating around the axle as the shroud is adjusted for reach.

The roller, which may be generally cylindrical, may roll along the shroud as it is adjusted for reach with little or no sliding between the shroud and outer surface of the roller element.

The cylindrical roller, which may be considered to be a wheel, may be arranged so that the inner face of the cylindrical roller and axle form a plain bearing whereby the roller may directly engage the axle surface, and slide relative to the axle face as the shroud is adjusted and the roller turns around the axle. Bearings may be provided between the axle and roller, and optionally a bushing may be provided between the axle and the roller. The applicant has appreciated that adjustment does not happen often and so wear is not an issue, and the friction present is relatively low compared with other forces the resist reach adjustment of the shroud, so a simple plain bearing may be the preferred arrangement for many embodiments.

At any given point on the roller the distance between the outer surface and the inner surface of the roller that engages the axle may be at least twice the outer diameter of the axle, and preferably at least 3 times the diameter or perhaps more than 4 times the diameter. The applicant has appreciated that the larger this distance (which will be the radius for a cylindrical roller) on the roller relative to the axle the lower the friction and the lower the force required to turn the roller. The applicant has appreciated that reduced force is advantageous because it reduces the force required to move the shroud telescopically.

The roller may be split into two releasably connected circumferential segments enabling the segments to be assembled around the axle before being connected to form the finished roller. The two segments may connect through a snap fit connection. To enable the snap fit connection at least part of the segments needs to be resilient, and this can be readily achieved by providing a roller which is made of plastic material.

The roller may include a central bore through which the axle passes, although it could work with the bore being slightly off-centre, as long as the roller will turn on the axle.

The outer surface of the roller which engages the underside of the shroud may be dished across its width, being raised slightly towards the edges relative to the centre, allowing the surface to conform to a curved surface of a tubular shroud.

The sprung support assembly may comprise at least one spring arm which is fixed towards one end to the vehicle and is connected to the axle that supports the roller at an opposing end. The arm may extend along one side of the shroud.

In a preferred arrangement the spring support comprises a pair of spring arms, one each side of the shroud, and a connecting bar that joins the opposing ends of the arms and passes under the shroud, the connecting bar forming an axle for the roller.

In a modification, the spring support may comprise a pair of spring arms, one each side of the shroud, and a connecting bar that joins the opposing ends of the arms and passes under the shroud, the axle for the roller resting at spaced locations on either side of the roller upon a respective part of the spring support.

The axle may be supported within detents or notches formed in the spring arms that define a bearing for the axle. The detent may be formed by bending a part of the spring arm into a u-shape, the axle resting in the bottom of the U-shape.

Where the axle is separate from, but supported by, the spring support, the roller can be fixed onto the axle so that the axle and roller rotate together. The roller may be overmolded onto the axle. Alternatively, the roller may be mounted on the axle through one or more bearings.

The region of the upper shroud which engages the roller may be made of a low friction material, such as PTFE, or may be a polished metal surface. Similarly, the bearing surface of the axle or inner face of the roller may be made of a low friction material. Advantageously in some arrangements the surface of the shroud that contacts the roller is simply a portion of the metal shroud, reducing the number of steps needed during manufacture.

The arms of the countersprung support assembly may be formed from a bent metal rod with a central portion forming the axle passing under the shroud to provide the support and the ends bent to form arms which include a torsion coil spring part.

Other advantages of this invention will become apparent to those skilled in the art from the following detailed description of the preferred embodiments, when read in light of the accompanying drawings.

DETAILED DESCRIPTION OF THE INVENTION

Figure 1:
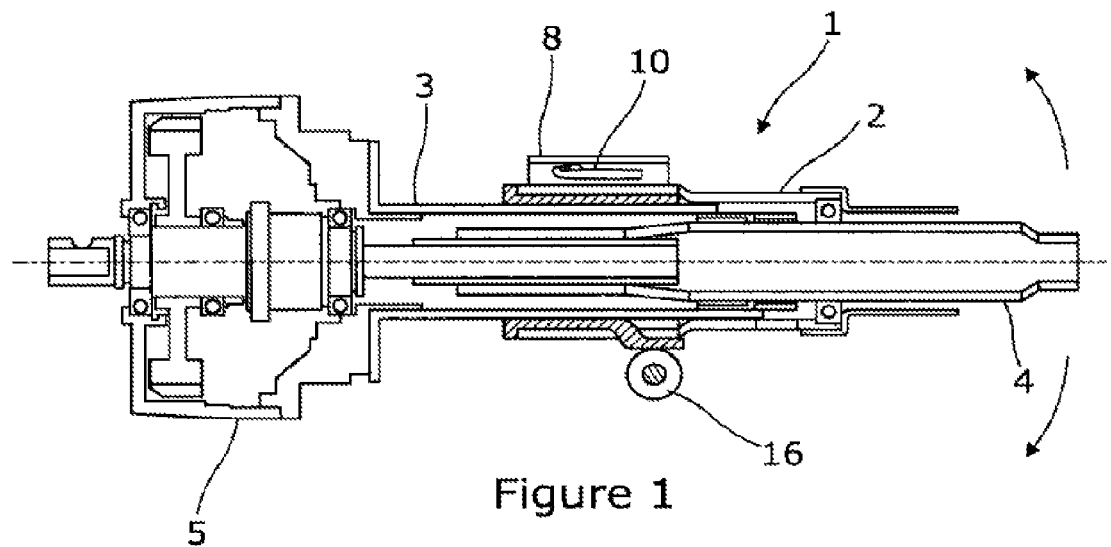
FIG. 1 is a diagrammatic view of a steering assembly including a steering column assembly in accordance with a first embodiment of the invention seen from one side.
Figure 2:
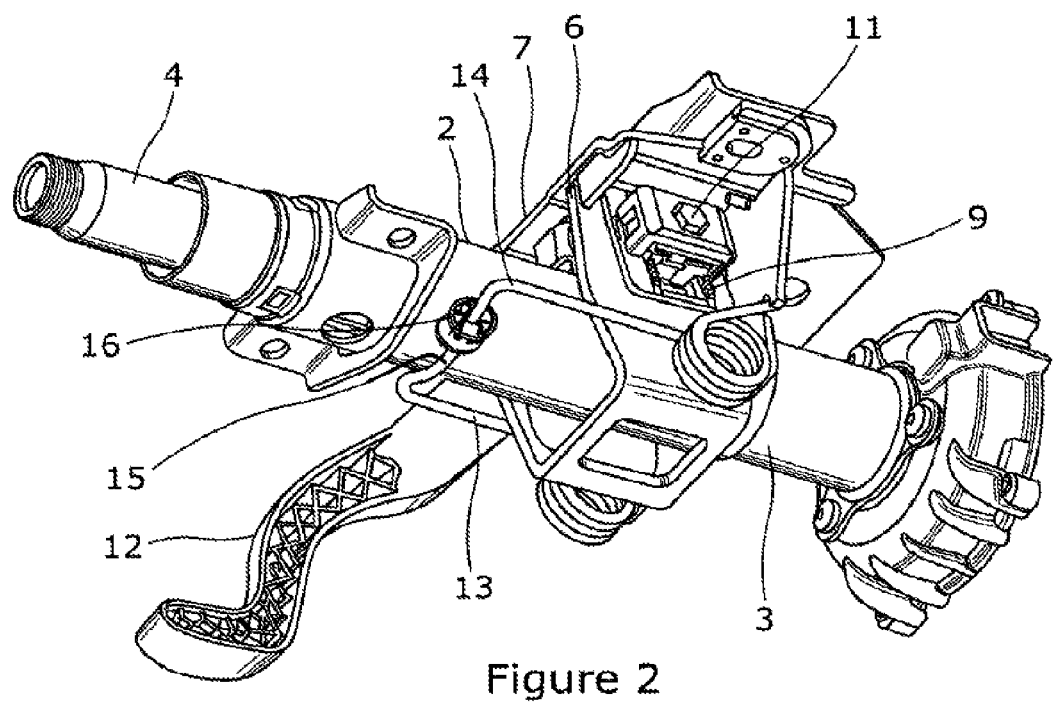
FIG. 2 is a view of the steering column assembly of FIG. 1 viewed in perspective from below and to one side.

A steering column assembly 1 is shown in FIGS. 1 and 2 of the accompanying drawings. The assembly comprises a telescopic shroud having an upper axially movable part 2 and a lower axially fixed part 3. The upper and lower parts are generally tubular with an upper end of the lower part fitted inside a lower end of the upper part. The lower part is fixed to the vehicle (not shown) by a pivot. A steering shaft 4 is supported in bearings journaled to the inside of the shroud, a steering wheel (not shown), is connected to an upper end of the shaft 4, and an optional electric power assisted steering gearbox 5 is connected to the end of the steering shaft 4 furthest from the steering wheel. The gearbox 5 connects the shaft 4 to a motor which provides assistance when the driver tries to turn the wheel by applying a torque of the same sense as that applied by the driver. The gearbox also connects the shaft through further mechanical links such as a steering rack to the road wheels (not shown) in a known manner.

The telescopic shroud 2, 3 is fixed to the vehicle at one point 6 by the pivot (not shown) close to the gearbox and at another point closer to the steering wheel through an adjustable clamp mechanism. The clamp assembly may be any known form, and functionally prevents the upper shroud part moving axially when it is in the clamped condition, and allows it to move axially when in the unclamped condition to permit reach adjustment of the steering assembly. The clamp assembly may also be arranged to permit axial collapse of the upper shroud portion in the event that a significant load is applied to the steering wheel during a crash.

The clamp mechanism also enables the shroud 2, 3 to tilt up and down about the pivot to provide rake adjustment of the steering wheel. This movement is only possible when the clamp mechanism is in the unclamped condition, being prevented when the clamp mechanism is in the clamped condition.

The clamp mechanism comprises a fixed bracket 6 which has an inverted U-shape in cross section (when viewed along the length of the shroud). The base 7 of the U shaped bracket 6 is rigidly fixed to the vehicle body above the shroud 2, 3 and has two arms that depend down either side of the shroud. A clamp rail 8, visible in FIG. 1, which is also of U-shape in cross section, is welded to the top of the shroud along a length of the shroud which is surrounded by the arms of the fixed bracket 6. The clamp rail 8 is a snug fit within the arms of the bracket 7 so that the side walls of the clamp rail touch the inside of the arms of the bracket 6 and prevent excessive side to side movement of the shroud relative to the bracket 6. As shown the rail 8 is fixed to the top of the second member of the shroud which has the larger diameter.

Each arm of the bracket 7 is provided with a vertically extending elongate slot. One slot 9 can be seen in FIG. 2. Each side wall of the clamp rail 8 is provided with a substantially horizontal slot 10 as shown in FIG. 1. A clamp bolt 11 passes through the slots in the arms and side rails and is provided with a fixed head on one end and an adjustable head on the other operated by a hand lever 12. The driver can rotate the hand lever 12 to move the adjustable head towards the fixed head. This clamps the arms of the bracket to the side walls of the clamp rail and locks the shroud in place. The driver can also move the lever 12 to expand the distance between the fixed head and adjustable head which unclamps the bracket arms and clamp rail. In this condition the clamp bolt can slide up and down the vertical rails to give rake adjustment and along the horizontal slots to give reach adjustment.

It will be appreciated that the weight of the shroud 2, 3 the steering shaft 4, the steering wheel and the moving part of the clamp mechanism is considerable. A sprung support mechanism is therefore provided to help carry some of the weight when the clamp assembly is unclamped.

Figure 3:
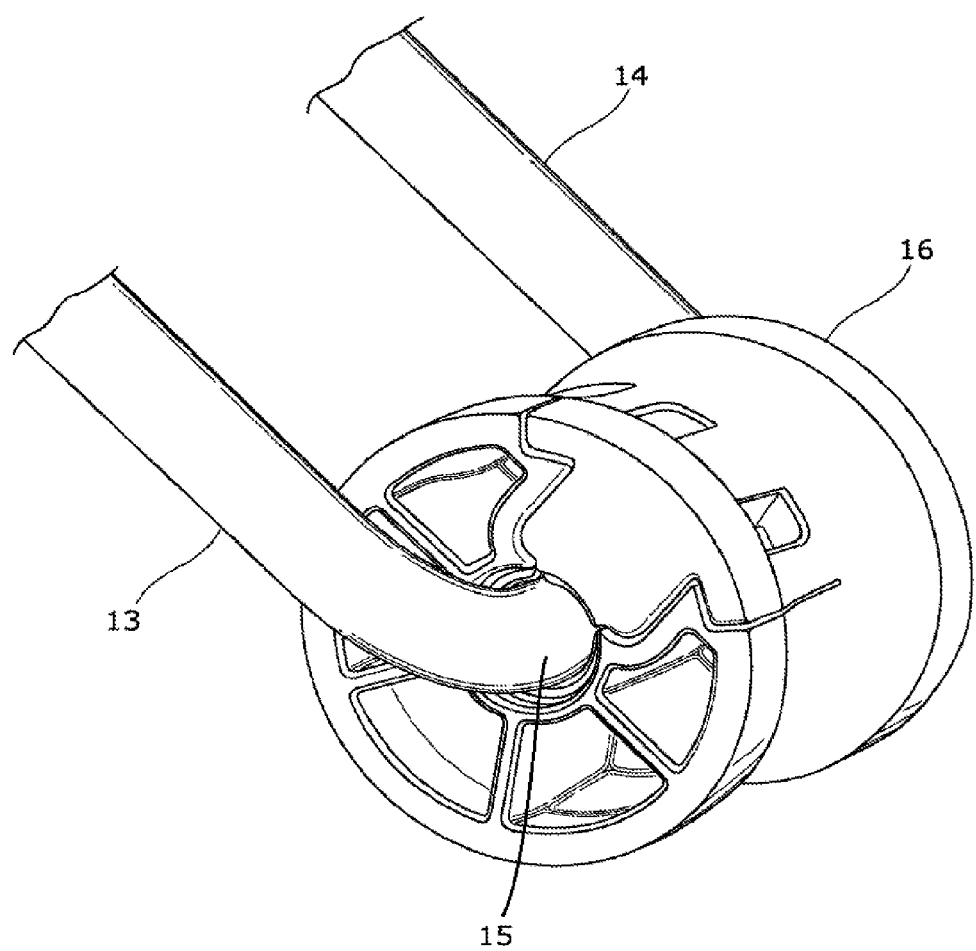
FIG. 3 is an enlarged perspective view of the portion of the spring assembly comprising the side arm, axle and roller.

The sprung support is formed from a bent metal wire or rod as shown in FIGS. 2 and 3. It has a lower portion forming an axle 15 that passes under the shroud 2, 3 and which is connected to the vehicle by two sprung arms 13, 14, one on each side of the shroud. Each arm comprises a torsion coil spring with multiple turns forming a right angled connection between the lower support portion and the fixed bracket. If the clamp mechanism is released with the steering wheel at its highest rake position, the sprung support mechanism damps the fall of the shroud. Typically, the spring rate of the arms is chosen so that the shroud will balance in its mid height position. It is then easier for the driver to raise the wheel to a desired rake as the spring takes much of the weight. Alternatively the spring rate of the arms may be chosen so that the shroud rises gently to its highest position.

As shown most clearly in FIG. 3, the axle 15 carries a roller or wheel 16, the interface between roller 15 and axle 15 forming a plain bearing. The outer circumferential surface of the roller 16 is generally cylindrical, being dished slightly across its width to match the outer profile of the upper shroud portion 2 which it contacts.

As the upper movable shroud portion 2 of the shroud is moved during reach adjustment it causes the roller 16 to move around the axle of the spring support. The roller 16 does not generally slide relative to the underside of the shroud, but instead rolls along the underside of the shroud. The sliding motion occurs between the inner face of the roller 16 and the surface of the axle 15. It can be shown that the use of the roller around an axle, compared with direct sliding contact between an axle and the underside of the shroud, reduces friction by the ratio of the inner diameter to the outer diameter of the roller, assuming friction coefficients are unchanged. Thus, for a ratio of 1:4 (inside diameter to outside diameter) the friction of the sliding spring support is reduced to 25 percent of the value that would be present without the roller.

Figure 4:
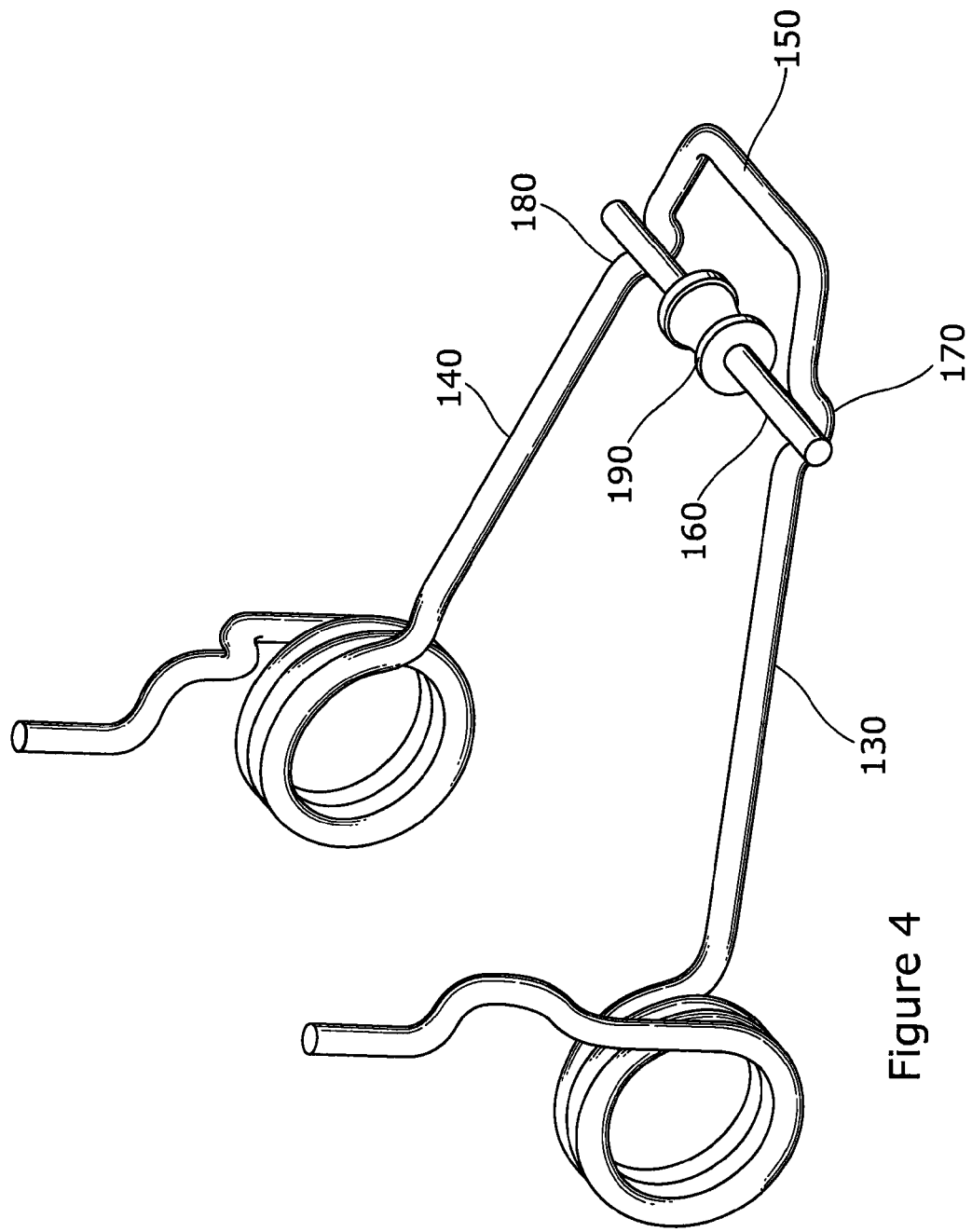
FIG. 4 is a view of an alternative spring assembly, axle and roller according to a further embodiment of the invention.

In a modification, shown in FIG. 4, the spring support may be separate from the axle supporting the roller. The spring support is substantially the same as the first embodiment with two support arms 130,140 connected by a cross bar 150. The cross bar does not form the axle. Instead, a separate axle 160 is provided, which is supported towards its ends in detents 170,180 formed in the arms. The detents are formed by bending each arm into a u-shape close to the cross bar 150. The axle 160 rests in the base of the u-shape. The axles Carrie a roller 190 which in this embodiment is overloaded onto the axle. This roller engages the underside of the shroud in a similar manner to the first embodiment.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly for a vehicle, the assembly comprising a shroud comprising an axially movable upper portion and an axially fixed lower portion, the upper and lower portions moving telescopically to provide adjustment for reach of the steering column assembly, a steering shaft which is supported by the shroud, a pivot which connects a part of the lower portion to a fixed part of the vehicle, a clamp mechanism which releasably fixes the upper and lower portions in position relative to one another and which also fixes the shroud in position relative to a further fixed part of the vehicle, and a sprung support assembly which is secured to a fixed part of the vehicle and which includes an axle that passes underneath the upper portion of the shroud and a cylindrical roller that surrounds a part of the axle generally in the middle thereof, and has an outer surface that engages the underside of the shroud and an inner surface that bears on the axle so that the sprung support at least partially supports the weight of the shroud when the clamp mechanism is released, the cylindrical roller rotating around the axle as the shroud is adjusted for reach, wherein the roller in use rolls along the shroud as the shroud is adjusted for reach with little or no sliding between the shroud and outer surface of the roller element, wherein the roller is arranged so that an inner face of the roller and the surface of the axle form a plain bearing whereby the roller may directly engage the axle surface, and slide relative to the axle surface as the shroud is adjusted and the roller turns around the axle and wherein an outer diameter of the roller is at least twice an outer diameter of the axle.

2. The steering column assembly according to claim 1 in which the sprung support assembly comprises at least one spring arm which is fixed at one end to the vehicle and is connected to the axle that supports the roller at an opposing end.

3. The steering column assembly according to claim 2 in which the sprung support assembly comprises a pair of spring arms, one each side of the shroud, and a connecting bar that joins the opposing ends of the arms and passes under the shroud, the connecting bar forming the axle for the roller.

4. The steering column assembly according to claim 3 in which each arm of the sprung support assembly is formed from a bent metal rod with a central portion forming the axle passing under the shroud to provide the support and the ends bent to form arms which include a torsion coil spring part.

5. The steering column assembly according to claim 1 in which the sprung support assembly comprises a pair of spring arms, one each side of the shroud, and a connecting bar that joins the opposing ends of the arms and passes under the shroud, and in which the axle is supported at spaced locations on either side of the roller by the spring arms.

* * * * *